Figure 1:
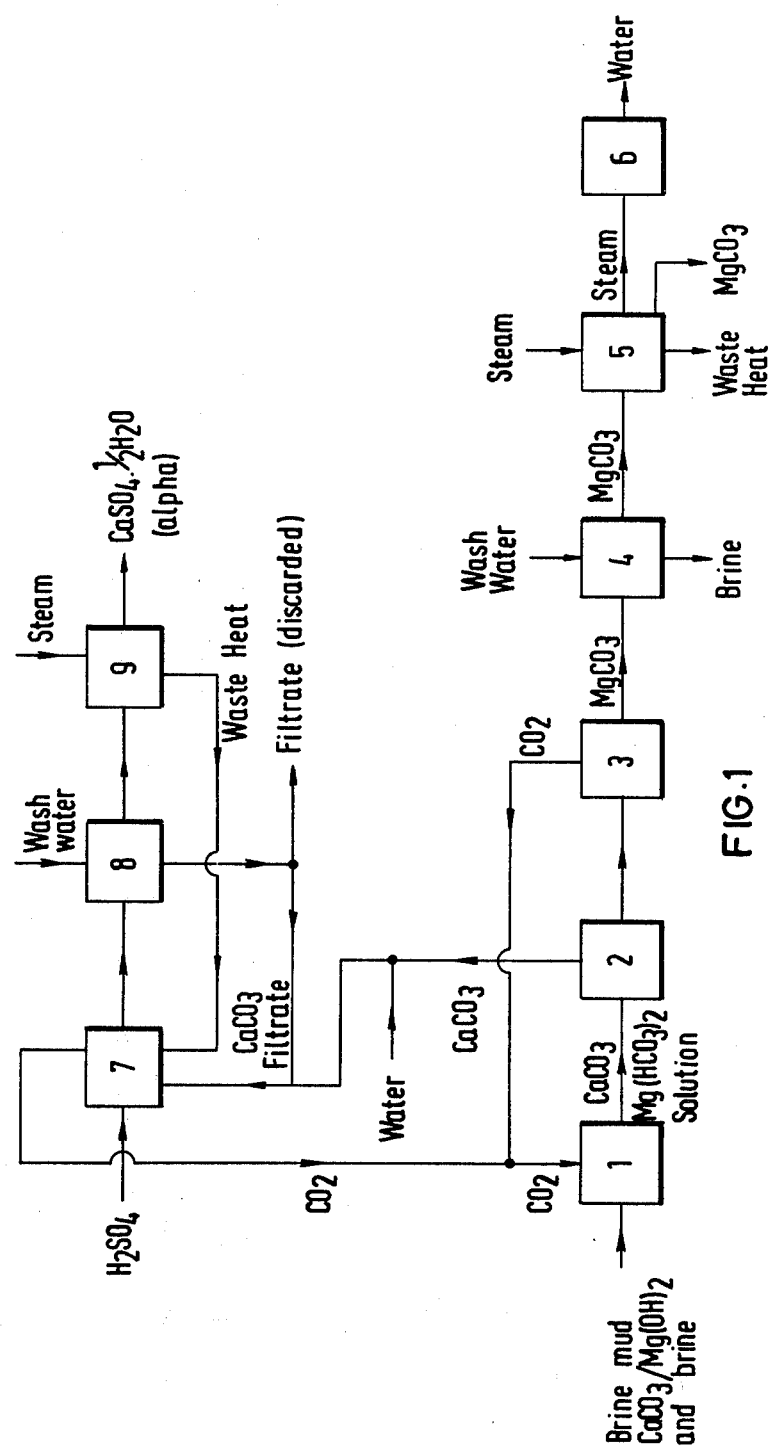

United States Patent [19]

Berrie et al.

[11] 4,210,626
[45] Jul. 1, 1980

[54] MANUFACTURE OF MAGNESIUM CARBONATE AND CALCIUM SULPHATE FROM BRINE MUD

[75] Inventors: John S. Berrie; Graham E. Woolley, both of Runcorn, England

[73] Assignee: Imperial Chemical Industries Limited, London, England

[21] Appl. No.: 688,547

[22] Filed: May 21, 1976

[30] Foreign Application Priority Data

Jun. 4, 1975 [GB] United Kingdom ............... 24103/75

[51] Int. Cl.$^2$ ......................... C01F 1/00; C01F 11/18; C01F 11/46
[52] U.S. Cl. .................................. 423/166; 423/165; 423/432; 423/555
[58] Field of Search ................ 423/165, 166, 169–172, 423/430, 431, 554, 555, 190, 432

[56] References Cited

U.S. PATENT DOCUMENTS

| | | | |
|---|---|---|---|
| 383,957 | 6/1888 | Leffmann | 423/438 |
| 641,550 | 1/1900 | Rothberg | 423/166 |
| 1,262,938 | 4/1918 | Galt | 423/430 |
| 1,540,391 | 6/1925 | Gelleri | 423/165 |
| 2,301,457 | 11/1942 | Sadtler et al. | 423/165 |
| 3,402,017 | 9/1968 | Ruiz | 423/165 |

*Primary Examiner*—O. R. Vertiz
*Assistant Examiner*—Gary P. Straub
*Attorney, Agent, or Firm*—Cushman, Darby & Cushman

[57] ABSTRACT

A process for treating "brine mud" as produced in brine purification processes and for the coproduction of a calcium sulphate and magnesium carbonate which comprises (i) carbonating a slurry of "brine mud" in sodium chloride brine with carbon dioxide to produce a slurry of solids comprising calcium carbonate and a liquor comprising magnesium bicarbonate and sodium chloride.

(ii) separating the slurry produced by the carbonation stage (i) into moist solid calcium carbonate and a liquor comprising magnesium bicarbonate and sodium chloride.

(iii) heating the liquor from (ii) to produce a slurry of solids comprising magnesium carbonate, a liquor comprising sodium chloride, and gaseous carbon dioxide.

(iv) separating the slurry from (iii) into moist hydrated magnesium carbonate and a liquor comprising sodium chloride and (v) drying the moist hydrated magnesium carbonate.

(vi) slurrying the calcium carbonate from stage (ii) with a water and interacting said slurry with sulphuric acid to produce a slurry comprising calcium sulphate in the solid phase and gaseous carbon dioxide.

(vii) separating moist calcium sulphate from the slurry produced in stage (vi), and (viii) drying the moist calcium sulphate from stage (vii) to give a dry calcium sulphate.

21 Claims, 1 Drawing Figure

MANUFACTURE OF MAGNESIUM CARBONATE AND CALCIUM SULPHATE FROM BRINE MUD

The present invention relates to the treatment of "brine mud" as produced in brine purification processes and to processes for the manufacture of magnesium carbonate and calcium sulphate.

Natural sodium chloride brine is a major raw material in the ammonia soda process, in the production of electrolytic chlorine and in the production of purified salt. It is necessary however to purify the natural brine before using in the aforesaid processes in order to remove impurities such as calcium ions, magnesium ions and sulphate ions which would otherwise precipitate as insoluble calcium and magnesium compounds at various stages in the processes. The purification stage is generally carried out by adding sodium carbonate (usually as solid soda ash) to the brine to precipitate calcium carbonate, followed by the addition of sodium hydroxide or lime solutions to precipitate magnesium hydroxide. The brine magma thus obtained is fed to settlers wherein the purified brine for use in the ammonia soda process or in chlorine cells, or in the production of purified salt, is removed as a clear liquor overflow, and the solid impurities are removed from the bottom of the settlers as a so-called "brine mud" and discarded as a waste product.

A typical analysis of the "brine mud" is as follows:

|          | % by weight |
|----------|-------------|
| $CaCO_3$ | 8.75        |
| $Mg(OH)_2$ | 1.77      |
| $SrCO_3$ | 0.02        |
| $NaCl$   | 21.8        |

The aforesaid "brine mud" is produced in large quantities (of the order of 3000 tons/day) and this gives rise to a disposal problem of considerable magnitude.

It is an object of the present invention to obviate or mitigate this disposal problem by treating the "brine mud" so as to separate the calcium carbonate solids and to convert the magnesium hydroxide into a soluble magnesium compound. It is a further object of the present invention to utilise the calcium carbonate and soluble magnesium compound thus obtained for the production of useful products, for example magnesium carbonate and calcium sulphate alpha-hemihydrate.

According to one aspect of the present invention we provide a process for treating "brine mud" (as hereinbefore defined) which comprises (i) carbonating a slurry of "brine mud" in sodium chloride brine with carbon dioxide to produce a slurry of solids comprising calcium carbonate and a liquor comprising magnesium bicarbonate and sodium chloride.

(ii) separating the slurry produced by the carbonation stage (i) into moist solid calcium carbonate and a liquor comprising magnesium bicarbonate and sodium chloride It will be appreciated that in stage (i), the calcium carbonate content of the slurry produced consists mainly of the calcium carbonate originally present in brine mud, although a small proportion of fresh calcium carbonate may also be precipitated in the course of the reaction. It will also be appreciated that the action of the carbon dioxide is to bicarbonate the magnesium hydroxide to form magnesium bicarbonate in solution.

The reaction in stage (i) is preferably carried out under controlled conditions of pH, suitably at a pH in the range 6–8 and especially at a pH of 7. The pH range can be conveniently controlled by adjusting the rate of addition of carbon dioxide.

The reaction between the slurry of "brine mud" in brine and carbon dioxide is conveniently carried out at ambient temperature. The reaction may be carried out at atmospheric pressure, if desired, but it is preferably carried out at superatmospheric pressure, for example at 5 atmospheres. The reaction may conveniently be carried out in a stirred reactor.

The calcium carbonate is separated in stage (ii) by any convenient means, for example by filtration or by centrifuging.

The liquor comprising magnesium bicarbonate in solution (obtained in stage (ii)) is preferably treated to convert the magnesium bicarbonate to magnesium carbonate.

Thus according to a further aspect of the present invention we provide a process for the production of a hydrated magnesium carbonate and calcium carbonate from brine mud which comprises (i) carbonating a slurry of "brine mud" in sodium chloride brine with carbon dioxide to produce a slurry of solids comprising calcium carbonate and a liquor comprising magnesium bicarbonate and sodium chloride, (ii) separating the slurry produced by the carbonation stage (i) into moist solid calcium carbonate and a liquor comprising magnesium bicarbonate and sodium chloride.

(iii) heating the liquor from (ii) to produce a slurry of solids comprising hydrated magnesium carbonate and a liquor comprising sodium chloride (iv) separating the slurry from (iii) into moist hydrated magnesium carbonate and a liquor comprising sodium chloride, and (v) drying the moist hydrated magnesium carbonate Stage (iii) is conveniently carried out by heating the magnesium bicarbonate-containing liquor at a temperature in the range 20° C. to 110° C. At temperatures below 50° C., magnesium carbonate trihydrate ($MgCO_3.3H_2O$) is produced. At temperatures between 50° C. and 110° C., a basic magnesium carbonate ($3MgCO_3.Mg(OH)_2.3H_2O$) is produced. Furthermore, as the temperature is increased, the yield of hydrated magnesium carbonate is increased, and the time required to decompose the magnesium bicarbonate may be reduced.

Carbon dioxide leaving stage (iii) may be recycled to stage (i), if desired, where it can be used to augment the carbon dioxide required for reacting with the "brine mud". The liquor containing sodium chloride is substantially pure and may, if desired, be resaturated with solid sodium chloride and recycled to the brine purification stage.

The moist hydrated magnesium carbonate separated in stage (iv) may be separated from its associated liquor by any convenient means, for example by filtration or centrifuging. The moist hydrated magnesium carbonate is conveniently dried at about 100° C. to 120° C., for example in a steam heated drier.

The dry hydrated magnesium carbonate thus produced has many industrial uses, for example in the manufacture of heat insulating, fireproofing, fire-extinguishing, flooring and polishing compositions, as a filler for paper, plastics, paints and varnishes, as a raw material for magnesium oxide manufacture and in pharmaceutical applications.

The calcium carbonate separated in stage (ii) may, if desired, be washed substantially free of sodium chloride to give a product which is useful commercially, for example as a filler. Alternatively, the calcium carbonate separated in stage (ii) may usefully be converted to calcium sulphate by slurrying in water and reacting this slurry with sulphuric acid to give calcium sulphate solids and carbon dioxide (which may be recycled to react with the "brine mud" in stage (i)).

Thus according to yet a further aspect of the present invention we provide a process for the manufacture of calcium sulphate and a hydrated magnesium carbonate which comprises (i) carbonating a slurry of "brine mud" in sodium chloride brine with carbon dioxide to produce a slurry of solids comprising calcium carbonate and a liquor comprising magnesium bicarbonate and sodium chloride, (ii) separating the slurry produced by the carbonation stage (i) into moist solid calcium carbonate and a liquor comprising magnesium bicarbonate and sodium chloride.

(iii) heating the liquor (ii) to produce a slurry of solids comprising hydrated magnesium carbonate and a liquor comprising sodium chloride.

(v) drying the moist hydrated magnesium carbonate (vi) slurrying the calcium carbonate from stage 8ii) with a water and interacting said slurry with sulphuric acid to produce a slurry comprising calcium sulphate in the solid phase and gaseous carbon dioxide (vii) separating moist calcium sulphate from the slurry produced in stage (vi), and (viii) drying the moist calcium sulphate from stage (vii) to give a dry calcium sulphate The carbon dioxide produced in stage (vi) is conveniently used for the carbonation of the "brine mud" in stage (i).

A range of aqueous solutions of sulphuric acid containing up to 98 percent by weight of $H_2SO_4$ may be used, and also fuming sulphuric acid or oleum, but it is preferred to use sulphuric acid solutions containing from 40% to 98% by weight of $H_2SO_4$. It is especially convenient to use impure sulphuric acid effluents which are produced in a number of industrial processes, for example the waste sulphuric acid produced in the manufacture of nitrobenzene, methyl methacrylate, and sodium cyanide, and the waste sulphuric acid obtained after being used as a drying agent (e.g. for drying chlorine gases, or chloromethanes).

The calcium sulphate solid phase obtained in stage (vi) may be calcium sulphate alpha-hemihydrate, calcium sulphate dihydrate (gypsum), or anhydrous calcium sulphate (anhydrite) dependent on the conditions of the reaction.

In an aqueous system containing no other ions than calcium ions and sulphate ions, the calcium sulphate hemihydrate/gypsum transition temperature is about 95° C. The transition temperature is affected, however, to some extent by the actual concentrations of the calcium ions and the sulphate ions and to a much greater extent by the concentrations of other ions which may be present, especially chloride ions. In the presence of chloride ions, the transition temperature is lowered. For example when reacting the calcium carbonate solution with sulphuric acid in stage (vi), the transition temperature is reduced to about 70° C. if chloride ions are also present at a concentration of 98 g/liter. The chloride content of the calcium carbonate used in stage (vi) would be dependent on the amount of washing carried out on the calcium carbonate following stage (ii) and prior to stage (vi).

When it is desired to precipitate alpha-hemihydrate in stage (vi) the reaction may be carried out at any temperature above the transition temperature, but the degree of conversion of the reacting materials to alpha-hemihydrate increases with increase in temperature and increase in residence time. The process is preferably carried out at a temperature of at least 20 degrees centigrade above the transition temperature. The process may conveniently be carried out at 95° to 110° at atmospheric pressure, or preferably at a temperature of at least 140° C., for example 150° to 160° C., at a superatmospheric pressure (for example between 5 and 10 atmospheres absolute). The residence time is conveniently in the range 0.5 minute to 60 minutes, and preferably in the range 5 minutes to 15 minutes.

Stage (vi) may be carried out in the presence of crystal habit modifiers which are known to assist in the production of alpha-hemihydrate of commercially useful crystalline structure, for example when producing alpha-hemihydrate from gypsum as described in U.K. Pat. No. 1,051,849. The habit modifiers include, for example, inorganic salts of trivalent metal ions, such as iron, aluminum, chromium, and polar organic compounds, for example acids and salts of acids.

When it is desired to precipitate gypsum in stage (vi), the reaction may be carried out at any temperature below the hemihydrate/gypsum transition temperature of about 70°-90° C. This stage of the process is conveniently carried out at atmospheric pressure. The residence time is conveniently in the range 0.5 to 60 minutes, and preferably in the range 2 to 10 minutes.

When it is desired to precipitate anhydrite in stage (vi), the reaction may be carried out at any temperature above the anhydrite/gypsum transition temperature (about 15°-40° C.), and preferably in the presence of seed crystals of anhydrite.

The calcium sulphate solid phase may be separated from the slurry of calcium sulphate and liquor (comprising essentially water or dilute sodium chloride brine) by any convenient means, for example by filtration or centrifuging, provided the temperature of the separation stage is maintained at a temperature at which the particular calcium sulphate solid phase is stable. When separating alpha-hemihydrate, the filter or centrifuge is conveniently operated at 100° C.; when separating gypsum, the filter or centrifuge is conveniently operated at ambient temperature; when separating anhydrite the temperature is preferably below the temperature at which the anhydrite is precipitated.

The separated calcium sulphate solids are suitably washed with water and the combined washings and filtrate, which are essentially neutral but may contain small amounts of calcium, sulphate and chloride ions, are discarded or used to slurry the calcium carbonate being fed to stage (vi).

The separated calcium sulphate is heated to remove moisture, for example in a steam heated drier at 100° to 120° C. to give dry alpha-hemihydrate, gypsum or anhydrite.

The gypsum may, if desired be converted to alpha-hemihydrate, for example by heating with steam in an autoclave reactor, preferably at a temperature of at least 140° C., for 140° C. to 160° C. and at a superatmospheric pressure of at least 5 to 10 atmospheres absolute.

The process according to the present invention may be carried out batchwise, if desired, but it is especially applicable to continuous production.

The dried alpha-hemihydrate produced in the present process may be used without further modification in the manufacture of plasterboard, wall blocks or as an inert filler. The gypsum or anhydrite may be used, for example, as a filler in various industries such as cement, paper and glass. The present process also provides useful outlets for "brine mud" and for low grade sulphuric acids produced in a number of processes. The utilisation of such waste products reduces the environmental problems associated with their disposal.

The invention is illustrated by the accompanying flow sheet (FIGURE 1) relating to the production of calcium sulphate alpha-hemihydrate and hydrated magnesium carbonate.

The stirred reactor 1 is fed with a slurry of "brine mud" in brine and reacted with carbon dioxide, for example at ambient temperature and under a pressure of 5 atmospheres. The rate of addition of carbon dioxide is adjusted to control the pH, for example in the range 6–8. The slurry thus obtained, containing calcium carbonate solids and dissolved magnesium bicarbonate, is passed to a filter or centrifuge 2. The liquor leaving the filter or centrifuge 2 is fed to a stirred crystalliser 3 in which the magnesium bicarbonate liquor is heated at 20° C. to 50° C. to give $MgCO_3.3H_2O$ or at 50°–110° C. to give $3MgCO_3.Mg(OH)_2.3H_2O$. The carbon dioxide leaving crystalliser 3 is recycled to the reactor 1. The slurry produced in crystalliser 3 is separated on a filter or centrifuge 4 to give hydrated magnesium carbonate solids and a liquor consisting mainly of brine. The hydrated magnesium carbonate solids are washed on the filter or centrifuge 4 and the moist solid thus obtained is dried in a steam heated drier 5. The brine and washings from the filter or centrifuge 4 are collected and, if desired, resaturated with solid salt. Dry hydrated magnesium carbonate is discharged from the drier 5, and the steam evolved is condensed in condenser 6 to provide condensate. The residual heat in the steam used in the drier 5 may be utilised in providing heat to the crystalliser 3.

The moist calcium carbonate separated in the filter or centrifuge 2 is slurried with water and/or with filtrate and washings from the filter or centrifuge 8 (see below) and reacted with waste sulphuric acid (typically containing 40% to 98% $H_2SO_4$) in reactor 7 at about 100° C. The carbon dioxide liberated in reactor 7 is recycled to the reactor 1.

The slurry of calcium sulphate alpha-hemihydrate produced in reactor 7 is fed to a filter or centrifuge 8 operating at about 100° C.

The alpha-hemihydrate separated in the filter or centrifuge 8 is washed with water and the moist solid passed to a steam heated drier 9 operating at about 120° C. Residual heat in the steam used in drier 10 may be utilised by feeding the steam to the reactor 7.

Part of the liquor and washings recovered from the filter or centrifuge 8 is discarded and the remainder is admixed with the calcium carbonate being fed to reactor 7.

The invention is further illustrated but not limited by the following Examples.

EXAMPLE 1

952 g of "brine mud" containing 185 g/liter of chloride were mixed with 1000 g of distilled water. The resulting slurry contained 0.45% w/w of magnesium as magnesium hydroxide, and 1.92% w/w calcium as calcium carbonate.

The slurry was stirred and carbon dioxide was bubbled through it at a steady rate of 125 ml/min. During the course of the reaction the pH fell from pH 11.4 to pH 7.0 and the reaction temperature increased from 22.5° C. to 27.8° C. The reaction was complete after 2 hours and all the magnesium had been taken into solution.

The slurry was then filtered to remove the solid residue of calcium carbonate. The clear carbonated liquor was stirred vigorously, warmed up to 50° C., and treated by blowing air through it at 500 ml/min. After 4½ hours the precipitation of magnesium carbonate reached a maximum. The magnesium carbonate was filtered off, washed with water and then dried. 30 g of magnesium carbonate trihydrate ($MgCO_3.3H_2O$) were obtained, corresponding to a 73% recovery of magnesium.

The conversion of calcium carbonate to alpha-hemihydrate is illustrated as follows: 55 ml of 98% sulphuric acid were added over a period of 12 minutes to a slurry of 100 g calcium carbonate (substantially free of magnesium) in 1 liter of water contained in a stirred reactor. The temperature of the calcium carbonate slurry was initially at 98° C. and the temperature of the reaction mixture fell to 95° C. during the addition of the sulphuric acid. The reaction mixture was stirred for a further 18 minutes and then filtered under reduced pressure. The calcium sulphate solids were washed with water and then dried to give 137 g of calcium sulphate alpha-hemihydrate, containing a small amount of unreacted calcium carbonate.

EXAMPLE 2

1000 g of "brine mud" containing 160 g chloride were mixed with 1000 g of distilled water. The resulting slurry contained 0.89% w/w magnesium hydroxide and 4.4% w/w calcium carbonate.

The slurry was stirred and carbon dioxide bubbled through it at atmospheric pressure at a steady rate of 125 ml/min. During the course of the reaction the pH fell from pH 11.0 to pH 7.5 and the reaction temperature increased from 22.2° C. to 37° C. The reaction was complete after 2 hours and all the magnesium had been taken into solution.

The slurry was then filtered to remove the solid residue of calcium carbonate. 500 ml of the clear liquor was then heated to 101° C. by injection of live steam into the solution for 10 minutes. The initial concentration of magnesium ions in the filtrate was 2480 ppm w/v and after 10 minutes reaction the magnesium ion level in solution was 109 ppm w/v (vol. 630 mls). The conversion to $3MgCO_3.Mg(OH)_2.3H_2O$ was 94.5%.

The conversion of calcium carbonate to alpha-hemihydrate is illustrated as follows:

55 ml of 98% sulphuric acid were added over a period of 15 minutes to a slurry of 100 g of calcium carbonate (containing 1.1 w/w magnesium) in a liter of water contained in a stirred reactor. The reaction mixture was held under agitation at 98° C. for a further 20 minutes and then filtered under vacuum. The calcium sulphate crystals were washed with water and dried to yield alpha-hemihydrate (128 g) containing a small amount of calcium carbonate.

EXAMPLE 3

Calcium carbonate, separated from brine mud in the same way as in Example 1 or Example 2, was converted to gypsum as follows:

82 ml of 98% sulphuric acid were added over a period of 26 minutes to a slurry of 150 g of calcium carbonate (substantially free of magnesium) in 1 liter of water contained in a stirred reactor. The reaction mixture was held under agitation at 50° C. for a further 20 minutes and then filtered under reduced pressure. The calcium sulphate crystals were washed with water and dried to give 215 g of gypsum, $CaSO_4.2H_2O$, containing a trace of calcium carbonate.

What we claim is:

1. A process for treating brine mud, the precipitate resulting from the purification of sodium chloride brine which comprises solid calcium carbonate, solid magnesium hydroxide and aqueous sodium chloride solution, said process comprising:
   (i) carbonating a slurry of brine mud in sodium chloride brine to a pH in the range of 6–8 with carbon dioxide to produce a slurry of solids comprising calcium carbonate and a liquor comprising magnesium bicarbonate and sodium chloride, and
   (ii) separating the slurry produced by the carbonation stage (i) into moist solid calcium carbonate and a liquor comprising magnesium bicarbonate and sodium chloride.

2. A process as claimed in claim 1 wherein stage (i) is carried out to a pH of about 7.

3. A process as claimed in claim 1 wherein stage (i) is carried out at ambient temperature.

4. A process as claimed in claim 1 wherein stage (i) is carried out at superatmospheric pressure.

5. A process as claimed in claim 1 which comprises the further steps of
   (iii) heating the liquor from (ii) to produce a slurry of solids comprising magnesium carbonate, a liquor comprising sodium chloride, and gaseous carbon dioxide.
   (iv) separating the slurry from (iii) into moist hydrated magnesium carbonate and a liquor comprising sodium chloride and
   (v) drying the moist hydrated magnesium carbonate.

6. A process as claimed in claim 5 wherein the carbon dioxide produced in stage (iii) is used to carbonate the slurry of brine mud in stage (i).

7. A process as claimed in claim 5 wherein the moist magnesium carbonate produced in stage (iv) is dried stage (v) at a temperature in the range from 100° C. to 120° C.

8. A process as claimed in claim 5 wherein stage (iii) is carried out at a temperature in the range from 20° C. to 110° C.

9. A process as claimed in claim 8 wherein stage (iii) is carried out at a temperature in the range from 20° C. to 50° C.

10. A process as claimed in claim 8 wherein stage (iii) is carried out at a temperature in the range from 50° C. to 110° C.

11. A process for treating brine mud, the precipitate resulting from the purification of sodium chloride brine, which comprises solid calcium carbonate, solid magnesium hydroxide and aqueous sodium chloride solution, said process comprising:
    (i) carbonating a slurry of brine mud in sodium chloride brine to a pH in the range of 6–8 with carbon dioxide to produce a slurry of solids comprising calcium carbonate and a liquor comprising magnesium bicarbonate and sodium chloride,
    (ii) separating the slurry produced by the carbonation stage (i) into moist solid calcium carbonate and a liquor comprising magnesium bicarbonate and sodium chloride,
    (iii) heating the liquor from (ii) to produce a slurry of solids comprising magnesium carbonate, a liquor comprising sodium chloride, and gaseous carbon dioxide,
    (iv) separating the slurry from (iii) into moist hydrated magnesium carbonate and a liquor comprising sodium chloride,
    (v) drying the moist hydrated magnesium carbonate,
    (vi) slurrying the calcium carbonate from stage (ii) with a water and interacting said slurry with sulphuric acid to produce a slurry comprising calcium sulphate in the solid phase and gaseous carbon dioxide,
    (vii) separating moist calcium sulphate from the slurry produced in stage (vi), and
    (viii) drying the moist calacium sulphate from stage (vii) to give a dry calcium sulphate.

12. A process as claimed in claim 11 wherein the sulphuric acid contains 40 to 98% by weight of $H_2SO_4$.

13. A process as claimed in claim 12 wherein the sulphuric acid is an impure sulphuric acid effluent.

14. A process as claimed in claim 11 wherein the gaseous carbon dioxide produced in stage (vi) is used to carbonate the slurry of brine mud in stage (i).

15. A process as claimed in claim 11 wherein stage (vi) is carried out at a temperature which is above the calcium sulphate hemihydrate/calcium sulphate dihydrate (gypsum) transition conditions so as to produce calcium sulphate alpha-hemihydrate as the solid phase.

16. A process as claimed in claim 15 wherein the reaction is carried out at a temperature of at least 20 degrees centigrade above the hemihydrate/gypsum transition temperature.

17. A process as claimed in claim 16 wherein the reaction is carried out in the range 95° C. to 110° C. at atmospheric pressure.

18. A process as claimed in claim 16 wherein the reaction is carried out at 140° C. to 160° C. at superatmospheric pressure.

19. A process as claimed in claim 18 wherein the reaction is carried out at 5–10 atmospheres absolute.

20. A process as claimed in claim 11 wherein stage (vi) is carried out at a temperature which is below the calcium sulphate hemihydrate/calcium sulphate dihydrate (gypsum) transition temperature under the reaction conditions so as to produce calcium sulphate dihydrate (gypsum) as the solid phase.

21. A process as claimed in claim 11 wherein stage (vi) is carried out at a temperature which is above the anhydrous calcium sulphate (anhydrite)/calcium sulphate dihydrate (gypsum) transition temperature under the reaction conditions so as to produce anhydrous calcium sulphate (anhydrite) as the solid phase.

* * * * *